US010594345B1

(12) United States Patent
Wu et al.

(10) Patent No.: US 10,594,345 B1
(45) Date of Patent: Mar. 17, 2020

(54) DIGITAL COMMUNICATION METHOD AND DIGITAL COMMUNICATION RECEIVER

(71) Applicant: Hughes Network Systems, Germantown, MD (US)

(72) Inventors: Xiaoming Wu, Germantown, MD (US); Qiujun Huang, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 0 days.

(21) Appl. No.: 16/236,839

(22) Filed: Dec. 31, 2018

(51) Int. Cl.
*H04B 1/10* (2006.01)
*H04L 1/00* (2006.01)

(52) U.S. Cl.
CPC ............. *H04B 1/10* (2013.01); *H04L 1/0057* (2013.01)

(58) Field of Classification Search
CPC ................................ H04B 1/10; H04L 1/0057
See application file for complete search history.

(56) References Cited

U.S. PATENT DOCUMENTS

| 6,188,718 | B1 * | 2/2001 | Gitlin | H04B 1/7107 375/148 |
| 7,991,066 | B2 * | 8/2011 | Lee | H04B 7/0417 375/267 |
| 2003/0202568 | A1 * | 10/2003 | Choi | H04B 1/71075 375/148 |
| 2015/0245271 | A1 * | 8/2015 | Balasubramanian | H04W 36/245 455/437 |
| 2018/0176815 | A1 * | 6/2018 | Hojeij | H04W 72/1215 |

* cited by examiner

*Primary Examiner* — Freshteh N Aghdam
(74) *Attorney, Agent, or Firm* — Global IP Counselors, LLP

(57) ABSTRACT

A digital communication method includes receiving user bursts at a receiver, generating, by the receiver, an active user list of the user bursts according to a first criterion, selecting, by the receiver, prioritized user bursts from the user bursts in the active user list according to a second criterion that is different from the first criterion to generate a priority user list of the prioritized user bursts, and executing, by the receiver, successive interference cancellation according to the priority user list to demodulate the prioritized user bursts.

16 Claims, 6 Drawing Sheets

| Segment ID (Arrival Time) | Correlation Magnitude From Latest Iteration | Number of Iterations Through The SIC | CRC Error Free | Mean Soft Output Check Status From Latest Iteration | Number Of Bursts On Top Each Other (From User Burst Location) | EsNo |
|---|---|---|---|---|---|---|
| | | | | | | |

FIG. 4

DIGITAL COMMUNICATION METHOD AND DIGITAL COMMUNICATION RECEIVER

CROSS-REFERENCE TO RELATED APPLICATIONS

Background

Field of the Invention

The present invention generally relates to a digital communication method. More specifically, the present invention relates to a digital communication method utilizing successive interference cancellation technique. Also, the present invention generally relates to a digital communication receiver.

Background Information

Satellite communication systems have emerged as an option for users to establish communication to terrestrial data networks, such as the Internet. Satellite communication systems typically utilize very small aperture terminals (VSATs) at the user locations. The VSATs allow users to access the terrestrial data networks. The VSATs are associated with a hub or gateway which provides a point of connection to the terrestrial data networks for the satellite communication system.

In such satellite communication systems, multiple access schemes are employed for enabling multiple users to simultaneously gain access to the satellite communication system. Specifically, in such multiple access schemes, user bursts are distributed throughout all time segments (time domain) and channels (frequency domain). Each time segment has a fixed length and usually spans over a single or multiple user burst lengths. In such satellite communication systems, an SIC (Successive Interference Cancellation) is utilized at the hub to decode user data for multiple users based on the user bursts. Specifically, the hub includes a plurality of parallel SIC processors that processes the user bursts of the multiple users for demodulation, decoding, re-modulation and cancellation.

SUMMARY

In particular, the hub is required to process more than a hundred partially overlapping user bursts across multiple channels within a certain time window, which usually consists of multiple time segments, using a limited number of SIC processors.

One object is to provide a digital communication method, with which resources for successive interference cancellation can be efficiently utilized to process user bursts.

In view of the state of the known technology, a digital communication method is provided that includes receiving user bursts at a receiver, generating, by the receiver, an active user list of the user bursts according to a first criterion, selecting, by the receiver, prioritized user bursts from the user bursts in the active user list according to a second criterion that is different from the first criterion to generate a priority user list of the prioritized user bursts, and executing, by the receiver, successive interference cancellation according to the priority user list to demodulate the prioritized user bursts.

Also, in view of the state of the known technology, a digital communication receiver is provided that includes at least one input data processor, and an SIC (Successive Interference Cancellation) processor. The at least one input data processor is configured to receive user bursts, configured to generate an active user list of the user bursts according to a first criterion, and configured to select prioritized user bursts from the user bursts in the active user list according to a second criterion that is different from the first criterion to generate a priority user list of the prioritized user bursts. The SIC processor is configured to execute successive interference cancellation according to the priority user list to demodulate the prioritized user bursts.

Also, other features, aspects and advantages of the disclosed digital communication method and receiver will become apparent to those skilled in the field of the digital communication method and receiver from the following detailed description, which, taken in conjunction with the annexed drawings, discloses several illustrative embodiments of digital communication method and receiver with various features.

BRIEF DESCRIPTION OF THE DRAWINGS

Referring now to the attached drawings which form a part of this original disclosure:

FIG. 4 illustrates a schematic diagram illustrating a data structure of user processed information stored in an active user list;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
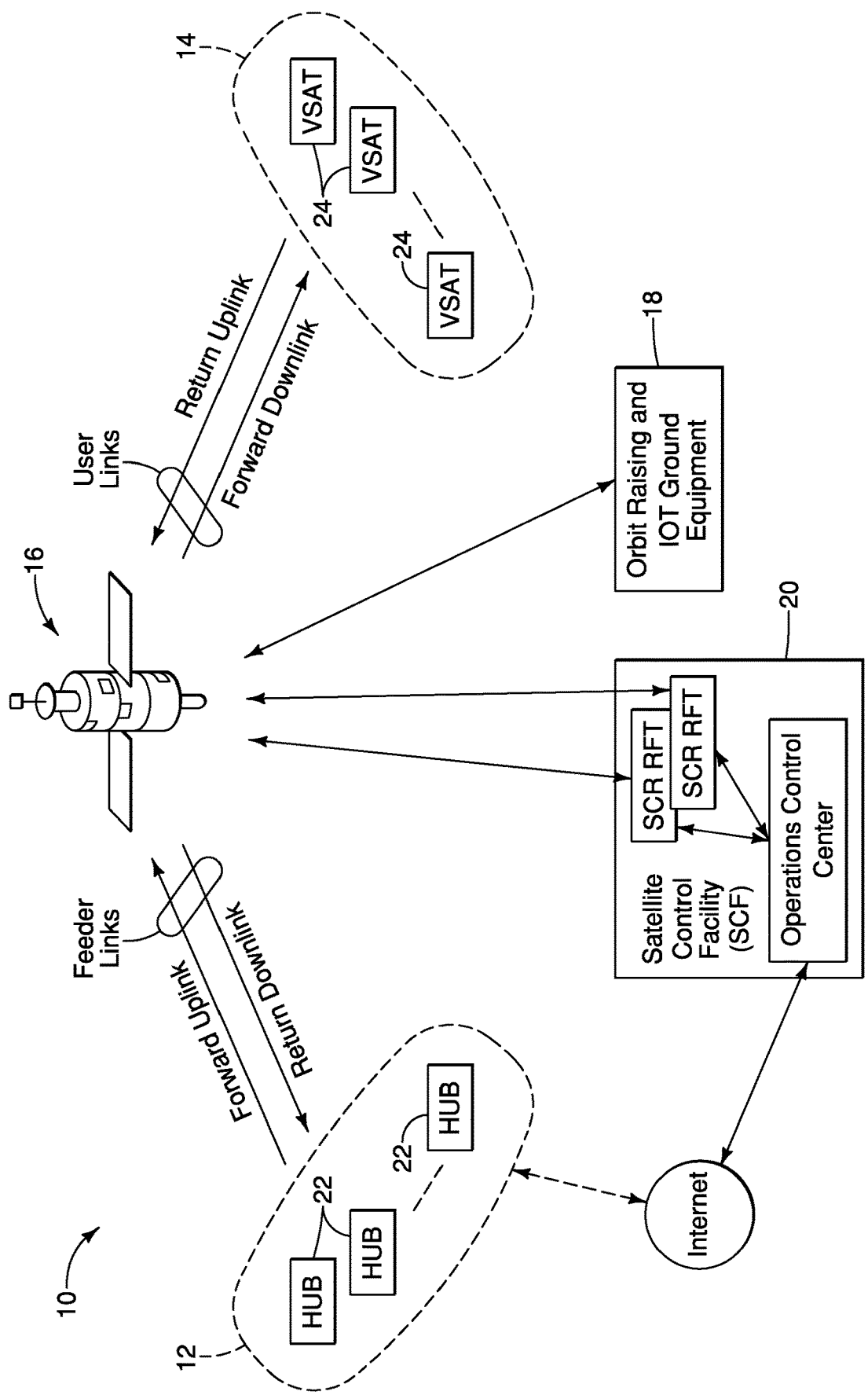
FIG. 1 illustrates an example of a satellite communication system according to one embodiment.

FIG. 1 illustrates an example of a satellite communication system 10 according to an exemplary embodiment. As shown in FIG. 1, the satellite communication system 10 includes a hub population 12 and a VSAT (Very Small Aperture Terminal) population 14 that links with the hub population 12 via an orbiting satellite 16. In particular, the hub population 12 and the VSAT population 14 link with each other via a satellite communications link that is a radio frequency link, such as a Ku-band link, a Ka-band link or any other suitable type of link as understood in the field of the satellite communication. In the illustrated embodiment, the satellite communication system 10 further includes a satellite control facility 18 and an orbit raising and IOT ground equipment 20.

The hub population 12 include a plurality of terrestrially mounted gateways or hubs 22 (e.g., digital communication receivers), while the VSAT population 14 includes a plurality of VSATs 24. The hubs 22 in the hub population 12 are connected to the VSATs 24 in the VSAT population 14 through the orbiting satellite 16. Specifically, In the illustrated embodiment, feeder links are established to carry data between the hubs 22 and the orbiting satellite 16, while user links are established to carry data between the orbiting satellite 16 and the VSATs 24. In particular, the feeder links include forward uplinks for transmitting data from the hubs 22 to the orbiting satellite 16, and return downlinks for transmitting data from the orbiting satellite 16 to the hubs 22. Also, the user links include return uplinks for transmitting data from the VSATs 24 to the orbiting satellite 16 and forward downlinks for transmitting data from the orbiting satellite 16 to the VSAT 24. The hubs 22 are high capacity, large antenna earth stations with connectivity to ground telecommunications infrastructure, such as the Internet. The detailed configuration of the hubs 22 will be described in detail later.

The VSATs 24 are located at end user locations to access the satellite communications system 10. In the illustrated embodiment, the VSATs 24 each include a remote satellite dish for receiving RF signals from and transmitting RF signals to the orbiting satellite 16, a satellite modem and other equipment for managing the sending and receiving of user data, as understood in the field of the satellite communication.

As illustrated in FIG. 1, the satellite control facility (SCF) 20 is a ground station used to control the orbiting satellite 16, and includes operations control center and satellite control facility radio frequency transceivers (SCF RFT), as understood in the field of the satellite communication. Also, the orbit raising and IOT ground equipment 18 performs orbit raising and in-orbit testing operations, as understood in the field of the satellite communication.

Figure 2:
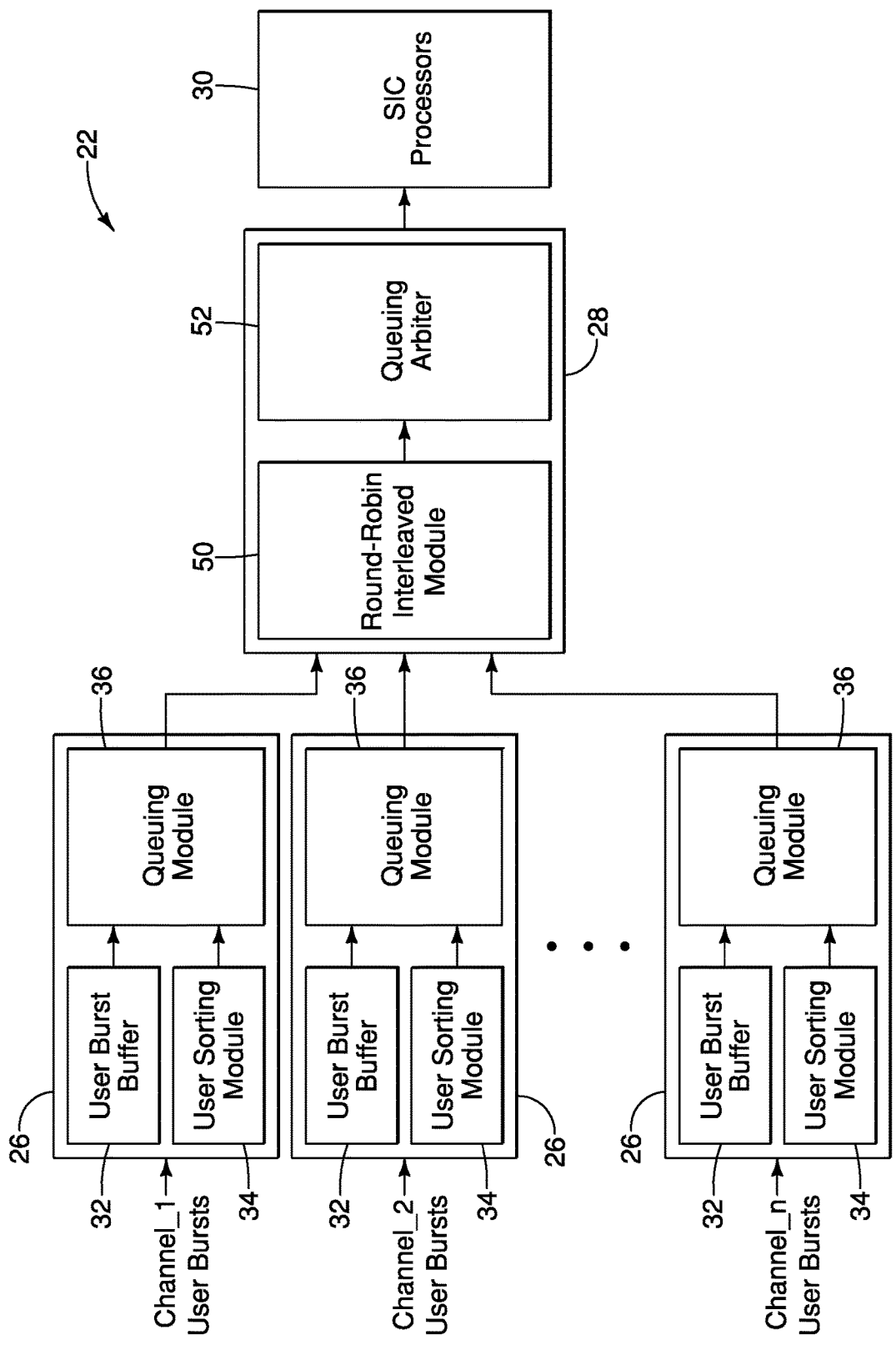
FIG. 2 illustrates a block diagram of a hub of the satellite communication system shown in FIG. 1.

As illustrated in FIG. 2, the hub 22 includes a plurality of input data processors 26, a queuing processor 28 and a plurality of parallel SIC processors 30. The hub 22 can also include other types of equipment, such as transceivers, amplifiers, waveguides, an antenna dish, and the like, as understood in the field of the satellite communication. In the illustrated embodiment, detailed description of relatively conventional equipment of the hub 22 will be omitted for the sake of brevity.

In the illustrated embodiment, the input data processors 26, the queuing processor 28 and the SIC processors 30 are each formed by a single or multiple microcomputers or processors with control programs that function in a manner as discussed herein. Of course, the input data processors 26, the queuing processor 28 and the SIC processors 30 can be integrally formed by a single microcomputer or processor, as needed and or desired. Also, the input data processors 26, the queuing processor 28 and the SIC processors 30 each can also include other conventional components such as an input interface circuit, an output interface circuit, and storage devices such as a ROM (Read Only Memory) device and a RAM (Random Access Memory) device. The RAM and ROM store processing results and control programs that are run by the input data processors 26, the queuing processor 28 and the SIC processors 30. The input data processors 26, the queuing processor 28 and the SIC processors 30 are operatively coupled to the components of the hub 22 as appropriate, in a conventional manner. It will be apparent to those skilled in the art from this disclosure that the precise structure and algorithms for the input data processors 26, the queuing processor 28 and the SIC processors 30 can be any combination of hardware and software that will carry out the functions of the present invention.

Referring further to FIG. 2, the detailed configuration and operation of each of the hubs 22 will be described. In the illustrated embodiment, with this satellite communication system 10, multiple access schemes are employed for enabling multiple users to simultaneously gain access to the satellite communication system 10. Specifically, user bursts from the VSATs 24 are distributed throughout all time segments (time domain) and channels (frequency domain), and are transmitted to the hub 22. In particular, in the illustrated embodiment, SCMA (Scrambled Code Multiple Access) is employed as the multiple access scheme for the satellite communication system 10. However, of course, other types of multiple access schemes, such as Asynchronous SCMA, FDMA (Frequency Division Multiple Access), TDMA (Time Division Multiple Access), CDMA (Code Division Multiple Access) and OFDMA (Orthogonal Frequency Division Multiple Access), can also be employed, as needed and/or desired.

The hub 22 receives, by the transceiver, the user bursts from the VSATs 24 via the orbiting satellite 16 via the satellite communications link, and decodes user data for multiple users based on the user bursts by utilizing an SIC (Successive Interference Cancellation). In the illustrated embodiment, the hub 22 operates as an iterative SIC based receiver. The main task of the hub 22 is to efficiently utilize a limited number of hardware resources to perform demodulation, decoding, re-modulation, and cancellation for a large number of partially overlapping user bursts across all time segments and channels. In particular, for efficiently utilize the limited number of hardware resources, the hub 22 employs a user sorting and queuing method or process (e.g., a digital communication method) to perform multiple user iterative SIC. Specifically, in the illustrated embodiment, the hub 22 processes the user bursts across multiple different channels (e.g., different communication channels) within a certain time window, which usually consists of multiple time segments, such as 8 time segments, for example. Here, each time segment has a fixed length and usually spans over a single or multiple user burst lengths. In the illustrated embodiment, the hub 22 operates on a sliding time window that spans over multiple time segments and typically slides at one segment a time.

In the illustrated embodiment, with the user sorting and queuing method of the hub 22, the received user bursts are sorted and selected as prioritized user bursts, and the prioritized user bursts are preferentially subjected to the iterative SIC. This user sorting and queuing method of the hub 22 is performed within the sliding time window. In the illustrated embodiment, this user sorting and queuing method of the hub 22 has two process layers: the first process layer is a process within a channel; and the second process layer is a process among different channels.

Specifically, in the illustrated embodiment, the input data processors 26 each perform the first process layer of the user sorting and queuing method of the hub 22 within a corresponding channel. Specifically, the input data processors 26 each sort and select the user bursts as prioritized user bursts within a corresponding channel. The queuing processor 28 performs the second process layer of the user sorting and queuing method of the hub 22 among different channels. Specifically, the queuing processor 28 allocates the prioritized user bursts of the different channels to the SIC processors 30. The SIC processors 30 each execute the iterative SIC to demodulate the prioritized user bursts and to decode the user data from the prioritized user bursts. In particular, the prioritized user bursts sent to the SIC processors 30 go through several pipelined stages, such as demodulation, decoding, re-modulation and cancellation. In the illustrated embodiment, the user burst processing of the SIC processors 30 (e.g., demodulation, decoding, re-modulation and cancellation) itself is relatively conventional, and thus will not be described in detail for the sake of brevity.

As illustrated in FIG. 2, the input data processors 26 are provided for a plurality of different channels (Channel_1, Channel_2, . . . , Channel_n), respectively. The input data processors 26 each perform the first process layer of the user sorting and queuing method of the hub 22 within a corresponding channel. As illustrated in FIG. 2, the input data processors 26 each includes a user burst buffer 32, a user sorting process or module 34 and a queuing process or module 36.

Specifically, the user burst buffer 32 continuously stores the user bursts of a corresponding channel that are received from the orbiting satellite 16. The user burst buffer 32 can be configured as a computer memory or storage device of the input data processor 26. In particular, each time the sliding time window is advanced, the user burst buffer 32 at least stores the user bursts of a corresponding channel within the sliding time window.

Figure 3:
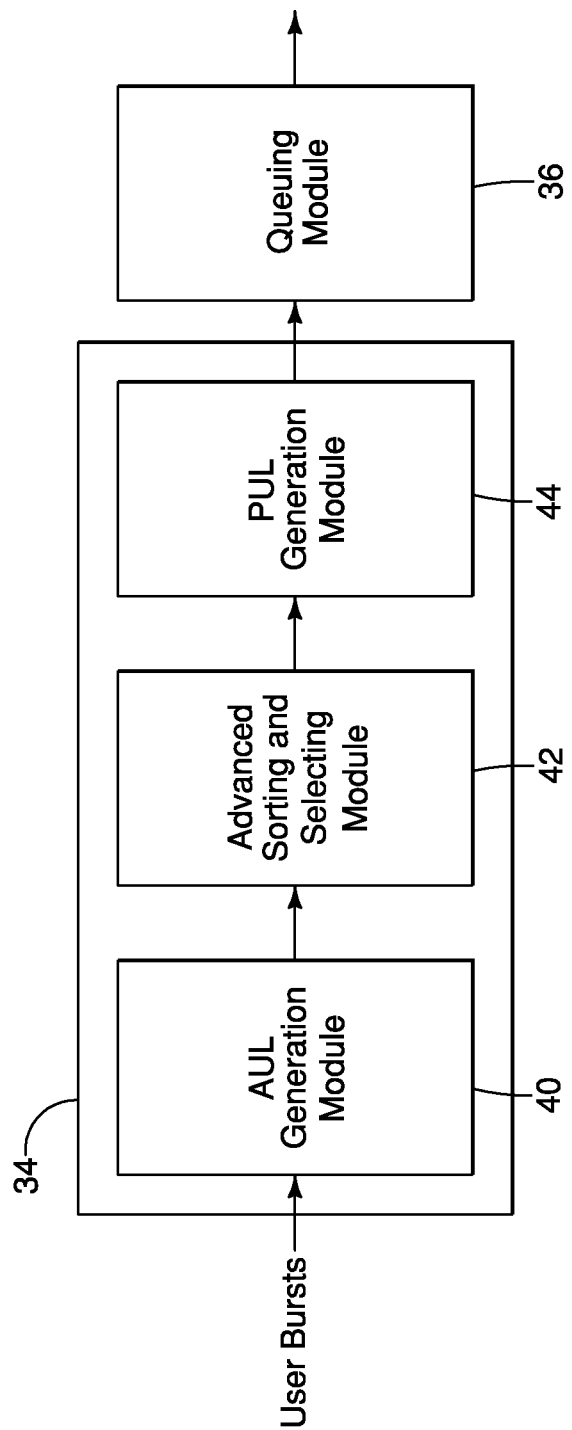
FIG. 3 illustrates a block diagram of the hub shown in FIG. 2, illustrating further details and functional configurations of the hub.

As illustrated in FIG. 3, the user sorting module 34 includes an AUL (Active User List) generation module or process 40, an advanced sorting and selecting module or process 42 and a PUL (Priority User List) generation module or process 44. FIG. 3 illustrates a functional block diagram of the user sorting module 34, and thus also illustrates a processing flow performed by the user sorting module 34.

The AUL generation module 40 functions as a UW (Unique Word) processor. The AUL generation module 40 first locates the user bursts by searching all of the UWs within the sliding time window each time the sliding time window is advanced (stepped or slid) by one time segment (i.e., at the start of each new sliding time window). Specifically, each time the sliding time window is advanced by one time segment, the AUL generation module 40, as the UW processor, scans the whole window size of samples and locates the detected user bursts. Then, the AUL generation module 40 sorts and places the detected user bursts into an active user list (AUL) to generate the AUL or update the AUL.

Specifically, the AUL generation module 40 sorts the user bursts based on predetermined criteria (e.g., a first criterion), such as an arrival time (e.g., burst arrival time) and/or magnitude of the user bursts (e.g., unique word detection value magnitude) to generate the AUL according to the predetermined criteria. For example, the AUL generation module 40 sorts the user bursts based on the arrival time from latest to oldest and/or magnitude of the user bursts from high to low. The ordering of the user bursts in the AUL remain the same throughout all the iterations for the sliding time window. On the other hand, the AUL is updated for every iteration of the SIC by the SIC processors 30. For example, when the SIC processors 30 performs the SIC over a certain number of iterations, such as 8 iterations, within the sliding time window, then the AUL can also be updated 8 times within the sliding time window (i.e., until the sliding time window is advanced). This AUL generation and update is performed by the AUL generation modules 40 of the input data processors 26 for the different channels, respectively.

FIG. 4 illustrates a data structure of user processed information stored in the AUL. As shown in FIG. 4, the AUL includes, for each user burst, segment ID (burst arrival time), the correlation magnitude of the unique word detection value from the latest iteration, the number of iterations through the SIC (e.g., iteration count of the SIC), information indicating whether the CRC (Cyclic Redundancy Check) error is free (CRC error free), the mean soft output (MSO) check status from the latest iteration of the SIC, the number of user bursts on top each other (user dependency), and the user burst EsNo from the latest iteration of the SIC. Basically, the segment ID and the correlation magnitude are obtained by processing the user bursts by the AUL generation module 40, while other user processed information is obtained from the SIC processors 30 as the execution results of the SIC by the SIC processors 30. Thus, the user processed information obtained from the SIC processors 30 in the AUL is updated for every iteration of the SIC by the SIC processors 30. In other words, the AUL is updated based on the execution results of the SIC.

Next, the advanced sorting and selecting module 42 further sorts and selects the user bursts in the AUL as the prioritized user bursts, and the PUL generation module 44 places the prioritized user bursts accordingly into a priority user list (PUL) to generate the PUL. The sorting and selecting at the advanced sorting and selecting module 42 is based on multiple parameters in the AUL, as shown in FIG. 4. Thus, the prioritized user bursts are selected from the user bursts in the AUL according to the multiple parameters (e.g., a second criterion or an execution result of the SIC) to generate the PUL. Also, the sorting and selecting of the user bursts is performed by the advanced sorting and selecting modules 42 of the input data processors 26 for the different channels, respectively, while the PUL generation is performed by the PUL generation modules 44 of the input data processors 26 for the different channels, respectively.

Figure 5:
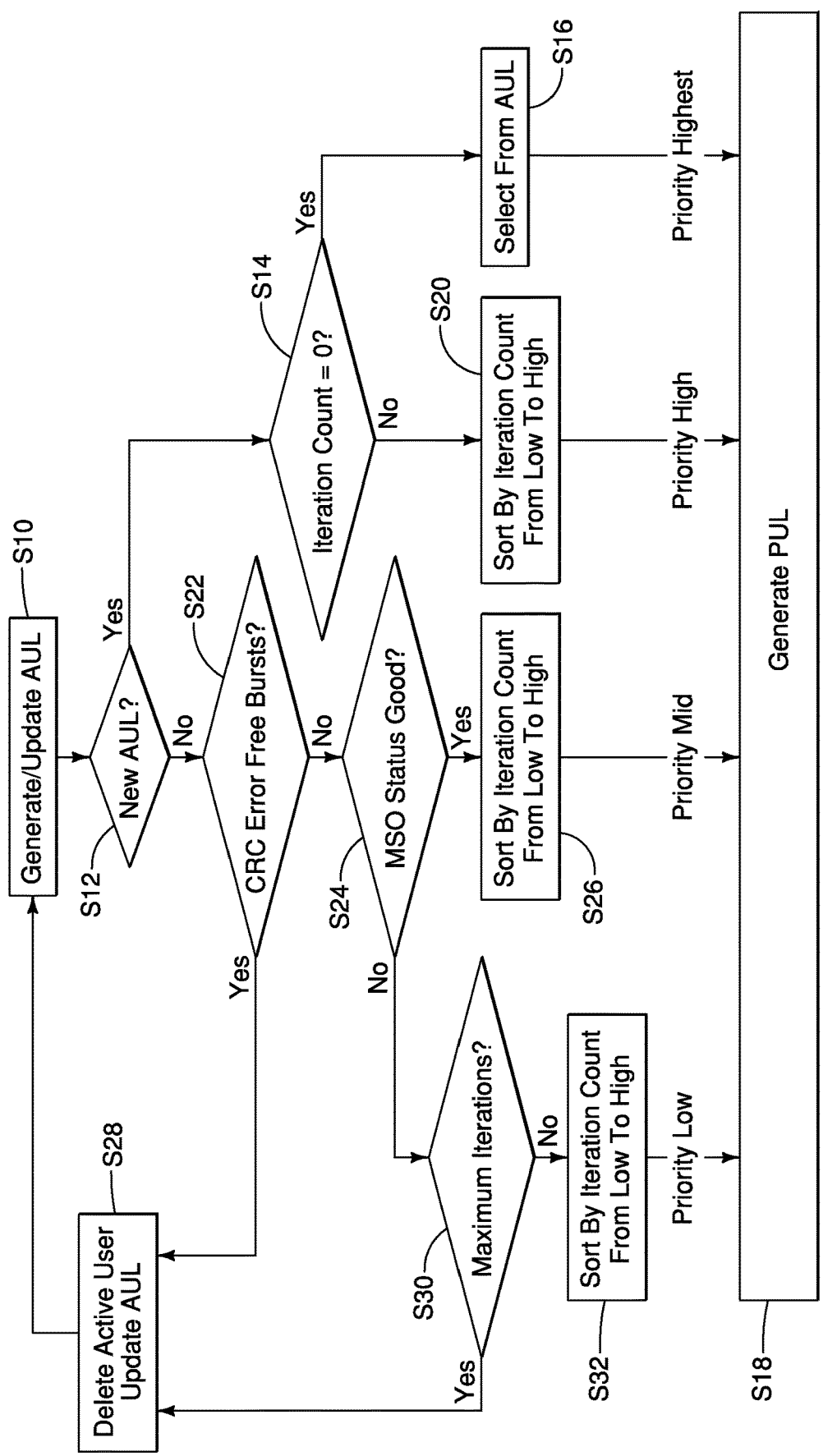
FIG. 5 illustrates a flowchart showing an advanced sorting and selecting process of user bursts by the hub shown in FIG. 2.

Referring now to FIG. 5, the advanced sorting and selecting process of the input data processors 26 for the different channels, which generates the PULs for the different channels, will be explained. This advanced sorting and selecting process is performed for every iteration of the SIC by the SIC processors 30, to generate or update the PUL for every iteration of the SIC by the SIC processors 30.

Specifically, the AUL generation module 40 first generates the AUL with the segment ID and/or the correlation magnitude at the start of each new sliding time window, or updates the AUL to includes the user processed information (FIG. 4) obtained from the SIC processors 30 after an iteration of the SIC by the SIC processors 30 (step S10). The advanced sorting and selecting module 42 determines whether the AUL is a new active user list (step S12). If the AUL is a new active user list (Yes in step S12), then the advanced sorting and selecting module 42 determines whether the number of iterations (iteration count) (FIG. 4) is zero (step S14). If the number of iterations is zero (Yes in step S14), then the advanced sorting and selecting module 42 selects a predetermined number of the user bursts that have been sorted in the AUL as the prioritized user bursts (step S16). Then, the PUL generation module 44 generates the PUL so as to include the prioritized user busts in a FIFO fashion (step S18).

If the number of iterations is not zero (No in step S14), then the advanced sorting and selecting module 42 sorts the user bursts in the AUL by the number of iterations from low to high (e.g., in an ascending order) to select the predetermined number of the sorted user bursts as the prioritized user bursts (step S20). Then, the PUL generation module 44 generates the PUL so as to include the prioritized user busts (step S18).

If the AUL is not a new active user list (No in step S12), then the advanced sorting and selecting module 42 determines whether there is a CRC error free user burst in the AUL based on the CRC error free information (FIG. 4) (step S22). If there is no CRC error free user burst (No in step S22), then the advanced sorting and selecting module 42 further determines whether there is a user burst with the MSO check status (FIG. 4) above a predetermined threshold, which indicates that the MSO check status is good (step S24). If there is a user burst with the MSO check status above the predetermined threshold in the AUL (Yes in step S24), then the advanced sorting and selecting module 42 sorts the user bursts in the AUL by the number of iterations from low to high to select the predetermined number of the sorted user bursts as the prioritized user bursts (step S26). Then, the PUL generation module 44 generates the PUL so as to include the prioritized user busts (step S18).

If there is a CRC error free user burst (Yes in step S22), then the AUL generation module 40 deletes this CRC error free user burst from the AUL to update the AUL (step S28). In other words, the user burst having information indicating CRC error free is deleted from the AUL. Then, the process goes back to step S10. If it is still within the same sliding time window, then the AUL generation module 40 updates the user processed information obtained from the SIC processors 30 in response to the iteration of the SIC by the SIC processors 30 (step S10).

If there is no user burst with the MSO check status above the predetermined threshold in the AUL (No in step S24), then the advanced sorting and selecting module 42 further determines whether there is a user burst with the number of iterations that has reached or exceeded a predetermined maximum number in the AUL (step S30). If there is no user burst with the number of iterations that has reached or exceeded the predetermined maximum number in the AUL (No in step S30), then the advanced sorting and selecting module 42 sorts the user bursts in the AUL by the number of iterations from low to high to select the predetermined number of the sorted user bursts as the prioritized user bursts (step S32). Then, the PUL generation module 44 generates the PUL so as to include the prioritized user busts (step S18).

If there is a user burst with the number of iterations that has reached or exceeded the predetermined maximum number in the AUL (Yes in step S30), then the AUL generation module 40 deletes this user burst with the number of iterations that has reached or exceeded the predetermined maximum number from the AUL to update the AUL (step S28). In other words, the user burst having information indicating the iteration count of the predetermined maximum number is deleted from the AUL. Then, the process goes back to step S10. If it is still within the same sliding time window, then the AUL generation module 40 updates the user processed information obtained from the SIC processors 30 in response to the iteration of the SIC by the SIC processors 30 (step S10).

The prioritized user bursts listed in the PUL are then queued by the queuing module 36 of the input data processor 26 for the processing of the queuing processor 28.

As illustrated in FIG. 2, the input data processors 26 generates the PULs for the different channels, respectively. The queuing modules 36 of the input data processors 26 obtain the prioritized user bursts in the PULs from the user burst buffers 32, respectively, and send them to the queuing processor 28, respectively. The queuing processor 28 includes a round-robin/interleaved module 50 and a queuing arbiter 52.

The prioritized user bursts in the PULs for the different channels are queued in a queue by the round-robin/interleaved module 50 using a round robin and/or interleaved scheme, and are sent to the queuing arbiter 52. For example, the prioritized user bursts in the PULs for the different channels are queued such that the prioritized user bursts of the different channels are processed by the SIC processors 30 channel by channel in the order of the channels (from Channel_1 to Channel_n). More specifically, the prioritized user bursts in the PULs for the different channels are queued such that all of the prioritized user bursts in the PUL for one channel (e.g., Channel_1) are processed by the SIC processors 30 first, after which all of the prioritized user bursts in the PUL for the next channel (e.g., Channel_2) are processed by the SIC processors 30. Then, the queuing arbiter 52 allocates the prioritized user bursts queued by the round-robin/interleaved module 50 to the SIC processors 30, respectively. Once the SIC processors 30 perform the SIC on all of the prioritized user bursts for a channel, then the advanced sorting and selecting process shown in FIG. 5 is performed for the channel within the same sliding time window to update the PUL for the channel. In the illustrated embodiment, the SIC processors 30 performs the SIC over a certain number of iterations, such as 8 iterations, within the sliding time window.

Figure 6:
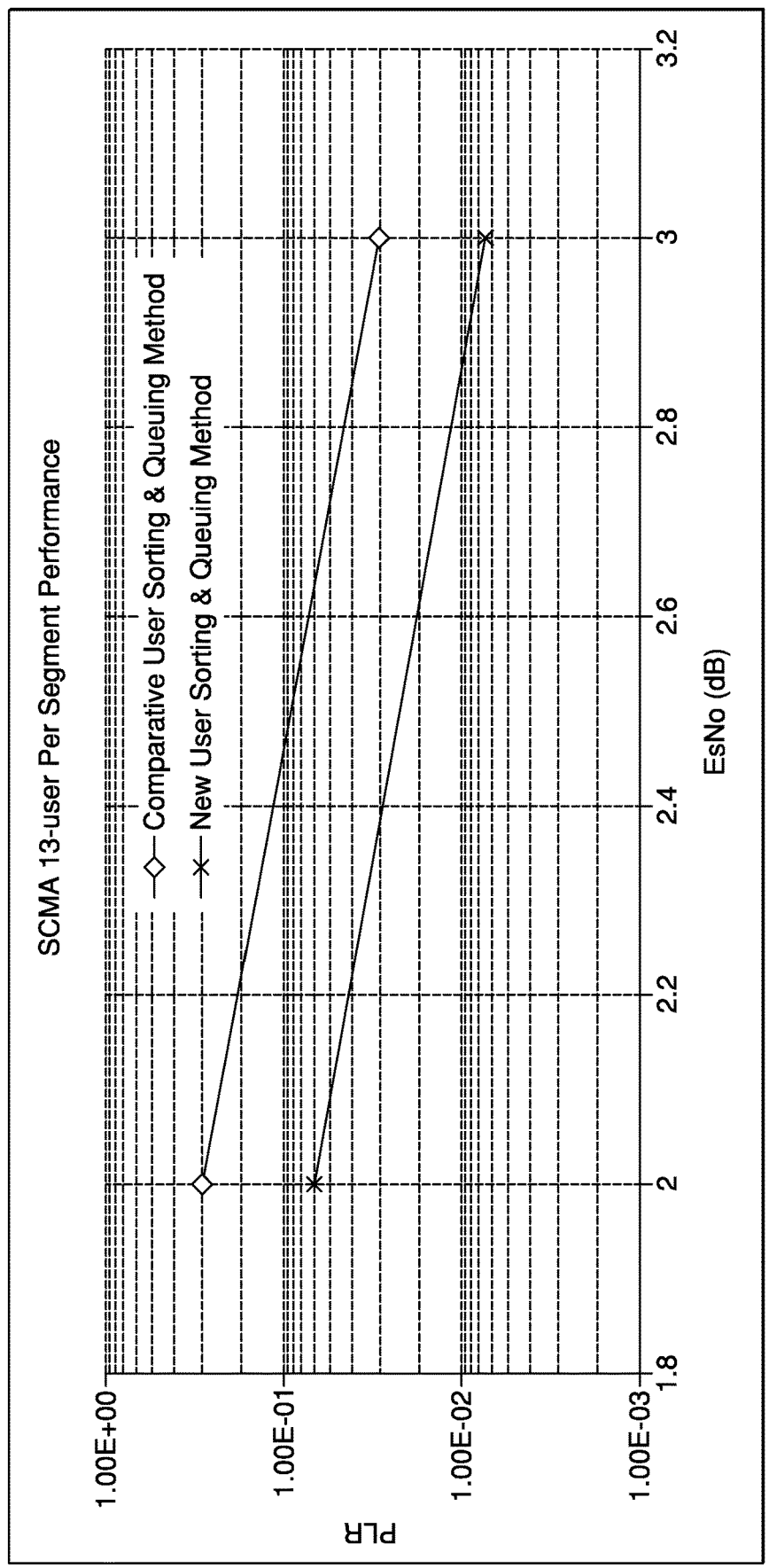
FIG. 6 illustrates a graph showing simulation results of a user sorting and queuing method according to one embodiment.

Referring now to FIG. 6, simulation results of the user sorting and queuing method of the present disclosure. The simulation is carried out using SCMA system bit accurate simulator (BAS) to verify the effect and performance of the user sorting and queuing method based on the following settings: OQPSK, Rate 1/9 LDPC coding, 5760 bits codeblock for each user burst; 13-user per time segment; one time segment is able to hold up to 20 user burst length; processing window is 1 segment; 8 different channels and 4 SIC processors; and maximum number of iterations (maximum iteration count) for each user burst is set to 10.

As shown in FIG. 6, with the user sorting and queuing method of the present disclosure, the following results are achieved relative to a comparative user sorting and queuing method described later: 0.6 dB+PLR (Packet Loss Rate) performance improvement is achieved; and 25% reduction in total iteration count is achieved.

Here, with the comparative user sorting and queuing method, all user bursts in a certain time segment and channel are first sorted solely based on a single predefined criterion, such as the arrival time or magnitude. The sorting of the user bursts is only performed once at the beginning of a new sliding time window. Thus, ordering of the user bursts in an AUL (Active User List) remains the same throughout all iterations until the sliding time window is advanced. With the comparative user sorting and queuing method, each channel has one AUL. Also, the sorted user bursts are divided into groups based on the number of available parallel SIC processors. Then, they are processed on a group by group and then a channel by channel basis. Specifically, the user bursts are queued according to an order of channels, which means that all the user bursts from one channel/AUL are processed first before the user bursts from the next channel/ALU can come in. Also, the SIC processors perform iterations of the SIC on all the detected user bursts. After all the detected user bursts are processed over all repetitions and a new segment worth of user bursts arrives, then the window is stepped or slides by a segment. With this comparative user sorting and queuing method, each user burst may require not just one but multiple iterations of the SIC to be decoded. This comparative user sorting and queuing method is simple, straightforward and effective for small number of user bursts. However, for a large number of user bursts, it can cause a significant amount of wasteful processing due to the large amount of duplicate and unnecessary iterations, which results in performance and throughput reduction.

On the other hand, with the user sorting and queuing method of the present disclosure, by spreading out user burst processing across the time and frequency domain, the time and frequency domain boundaries of the comparative user sorting and queuing method can be overcome. Thus, all SIC processors 30 and all pipelined stages within each SIC processor 30 can be allocated and shared more adaptively and efficiently by the user bursts across all time segments and channels. Therefore, the efficiency and productivity of the user burst processing within a channel can be increased. Also, the interference cancellation benefits across multiple channels can be maximized. Furthermore, the amount of wasteful processing can be reduced, and significant throughput and performance improvements can be achieved under the same amount of hardware resource and timing constraints.

With the user sorting and queuing method of the present disclosure, the total iteration counts required to process a given amount of user bursts across all time segments and channels can be reduced, which results in significant receiver throughput and performance improvement. Also, the user bursts can be successfully demodulated and decoded with fewer iterations of the SIC.

With the user sorting and queuing method of the present disclosure, a large number of partially overlapping user bursts across all time segments and channels can be processed with a limited number of the SIC processors 30. In particular, a multiple user iterative SIC based receiver (e.g., the hub 22) that can efficiently schedule a large number of user bursts for the user burst processing using a limited number of the SIC processors 30 can be provided.

With the user sorting and queuing method of the present disclosure, the user bursts are dynamically sorted and selected based on multiple parameters shown in FIG. 4.

With the user sorting and queuing method of the present disclosure, the user bursts across all channels can be allowed to occupy each SIC processor's pipeline stages on a shared and interleaved basis.

With the user sorting and queuing method of the present disclosure, only the user bursts in the PULs (e.g., the prioritized user bursts) are sent over to the SIC processors 30 for the user burst processing. Thus, the SIC processors 30 only need to process the prioritized user bursts that are queued based on the PULs.

With the user sorting and queuing method of the present disclosure, the sorting is performed and the PULs are dynamically generated for each iteration within the sliding time window. This increases the chance of the user bursts that are more likely to be successfully demodulated (e.g., the prioritized user bursts) to get processed first or earlier.

With the user sorting and queuing method of the present disclosure, among multiple channels, the SIC processors 30 process the user bursts using a round-robin and/or interleaved processing technique. This ensures that each channel achieves a maximum interference cancellation benefit before the next batch of user bursts from the channel gets in.

In the illustrated embodiment, the user sorting and queuing method of the present disclosure is employed in the satellite communication system 10. However, the present invention is not limited to this, and the user sorting and queuing method of the present disclosure can also be applied to the SCMA, the Asynchronous SCMA, and any other digital communication system utilizing multiple user iterative SIC technique.

In the illustrated embodiment, the user sorting and queuing method of the hub 22 has two process layers: the first process layer is a process within a channel; and the second process layer is a process among different channels. However, the user sorting and queuing method of the hub 22 can only have the first process layer that is a process within a channel. In this case, the SIC is executed by a channel by channel basis. Specifically, in this case, after all the user bursts from one channel are processed first by giving priority to the prioritized user bursts in the PUL of the channel for the SIC, the user bursts from the next channel are processed by giving priority to the prioritized user bursts in the PUL of the next channel for the SIC, for example.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also, the term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A digital communication method comprising:
    receiving user bursts at a receiver;
    generating, by the receiver, an active user list of the user bursts according to a first criterion;
    selecting, by the receiver, prioritized user bursts from the user bursts in the active user list according to a second criterion that is different from the first criterion to generate a priority user list of the prioritized user bursts; and executing, by the receiver, successive interference cancellation according to the priority user list to demodulate the prioritized user bursts, the generating of the active user list including generating the active user list based on burst arrival time as the first criterion.

2. The digital communication method according to claim 1, wherein
the selecting of the prioritized user bursts is performed for every iteration of the successive interference cancellation.

3. The digital communication method according to claim 1, wherein
the generating of the active user list includes updating the active user list based on an execution result of the successive interference cancellation.

4. The digital communication method according to claim 3, wherein
the updating of the active user list includes deleting from the active user list a user burst having information indicating CRC (Cyclic Redundancy Check) error free or information indicating iteration count of a predetermined maximum number.

5. The digital communication method according to claim 1, wherein
the receiving of the user bursts is performed for each of different channels,
the generating of the active user list is performed for each of the different channels to generate a plurality of active user lists for the different channels, respectively,
the selecting of the prioritized user bursts is performed for each of the different channels to generate a plurality of priority user lists for the different channels, respectively, and
the executing of the successive interference cancellation is performed according to the priority user lists for the different channels.

6. A digital communication method comprising:
receiving user bursts at a receiver;
generating, by the receiver, an active user list of the user bursts according to a first criterion;
selecting, by the receiver, prioritized user bursts from the user bursts in the active user list according to a second criterion that is different from the first criterion to generate a priority user list of the prioritized user bursts; and
executing, by the receiver, successive interference cancellation according to the priority user list to demodulate the prioritized user bursts,
the selecting of the prioritized user bursts including selecting the prioritized user bursts based on an execution result of the successive interference cancellation as the second criterion.

7. The digital communication method according to claim 6, wherein
the execution result of the successive interface cancellation includes iteration count of the successive interference cancellation for the user bursts.

8. The digital communication method according to claim 7, wherein
the selecting of the prioritized user bursts includes selecting the prioritized user bursts from the user bursts in an ascending order of the iteration count.

9. A digital communication receiver comprising:
at least one input data processor configured to receive user bursts, configured to generate an active user list of the user bursts according to a first criterion, and configured to select prioritized user bursts from the user bursts in the active user list according to a second criterion that is different from the first criterion to generate a priority user list of the prioritized user bursts; and
an SIC (Successive Interference Cancellation) processor configured to execute successive interference cancellation according to the priority user list to demodulate the prioritized user bursts,
the at least one input data processor being further configured to generate the active user list based on burst arrival time as the first criterion.

10. The digital communication receiver according to claim 9, wherein
the at least one input data processor is further configured to select the prioritized user bursts based on an execution result of the successive interference cancellation as the second criterion.

11. The digital communication receiver according to claim 10, wherein
the execution result of the successive interface cancellation includes iteration count of the successive interference cancellation for the user bursts.

12. The digital communication receiver according to claim 11, wherein
the at least one input data processor is further configured to select the prioritized user bursts from the user bursts in an ascending order of the iteration count.

13. The digital communication receiver according to claim 9, wherein
the at least one input data processor is further configured to select the prioritized user bursts for every iteration of the successive interference cancellation.

14. The digital communication receiver according to claim 9, wherein
the at least one input data processor is further configured to update the active user list based on an execution result of the successive interference cancellation.

15. The digital communication receiver according to claim 14, wherein
the at least one input data processor is further configured to update the active user list by deleting from the active user list a user burst having information indicating CRC (Cyclic Redundancy Check) error free or information indicating iteration count of a predetermined maximum number.

16. The digital communication receiver according to claim 9, wherein
the at least one input data processor includes a plurality of input data processors for different channels, respectively, the input data processors being configured to receive the user bursts for the different channels, respectively, configured to generate a plurality of active user lists for the different channels, respectively, and configured to select the prioritized user bursts for the different channels to generate a plurality of priority user lists for the different channels, respectively, and
the SIC processor is configured to execute the successive interference cancellation according to the priority user lists for the different channels.

* * * * *